United States Patent
Wiant

(10) Patent No.: US 10,312,678 B1
(45) Date of Patent: Jun. 4, 2019

(54) BUS BRACE APPARATUS, BUS ASSEMBLIES, AND METHODS OF BRACING BUS BARS

(71) Applicant: Siemens Industry, Inc., Alpharetta, GA (US)

(72) Inventor: Jason P. Wiant, Bedford, TX (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 0 days.

(21) Appl. No.: 16/053,843

(22) Filed: Aug. 3, 2018

(51) Int. Cl.
*H02G 5/02* (2006.01)
*H02B 1/21* (2006.01)
*H01R 25/16* (2006.01)

(52) U.S. Cl.
CPC ........... *H02G 5/025* (2013.01); *H01R 25/162* (2013.01); *H02B 1/21* (2013.01)

(58) Field of Classification Search
CPC ......... H02B 1/21; H01R 25/162; H02G 5/025
USPC ............... 361/611, 624, 637–639; 174/99 B, 174/149 B, 68.2; 439/212
See application file for complete search history.

(56) References Cited

U.S. PATENT DOCUMENTS

| | | | | |
|---|---|---|---|---|
| 2,318,859 A | * | 5/1943 | Huguelet | H02G 5/025 174/68.2 |
| 3,315,132 A | * | 4/1967 | Raymond | H02G 5/025 174/72 B |
| 4,025,826 A | * | 5/1977 | Wilson | H02B 1/21 174/133 B |
| 4,431,152 A | * | 2/1984 | Reed, Jr. | H02G 3/0683 248/65 |
| 6,040,976 A | | 3/2000 | Bruner et al. | |
| 6,111,745 A | | 8/2000 | Wilkie, II et al. | |
| 6,169,248 B1 | | 1/2001 | Rowe et al. | |
| 7,075,021 B2 | | 7/2006 | Rowe et al. | |
| 7,285,724 B2 | * | 10/2007 | Buettner | H02G 5/025 174/68.2 |
| 7,449,635 B2 | | 11/2008 | Wiant | |
| 8,014,131 B2 | | 9/2011 | Hudgins, Jr. et al. | |
| 8,437,118 B2 | | 5/2013 | Kasza et al. | |
| 8,717,741 B2 | | 5/2014 | Valenzuela | |
| 9,144,161 B2 | | 9/2015 | Kozuru et al. | |
| 9,391,413 B2 | | 7/2016 | Blasbalg et al. | |
| 9,608,413 B2 | | 3/2017 | Kubota et al. | |
| 9,622,374 B2 | | 4/2017 | Bhattacharya et al. | |
| 9,705,294 B2 | | 7/2017 | Kubota et al. | |

(Continued)

*Primary Examiner* — Zachary Pape

(57) ABSTRACT

A bus brace apparatus for bracing electrical bus bars. The bus brace apparatus includes a bracing block with a plurality of bus bar-receiving recesses configured to receive bus bars therein and a plurality of legs defining sides of the bus-receiving recesses, wherein the legs including first apertures formed there through. Insulating positioners are received in each of the plurality of bus bar-receiving recesses and each of the insulating positioners include a second aperture formed therein. A fastener extends through each of the first and second apertures and aligns each of the insulating positioners within the bus bar-receiving recesses. A channel member is coupled to the bracing block and includes one or more sides configured to interface with a surface of the insulating positioners and limit rotation thereof in the bus bar-receiving recesses. Bus bar assemblies and methods of bracing bus bars are disclosed, as are other aspects.

20 Claims, 8 Drawing Sheets

(56) References Cited

U.S. PATENT DOCUMENTS

2010/0051342 A1 3/2010 Diaz
2011/0083872 A1 4/2011 Zhang

* cited by examiner

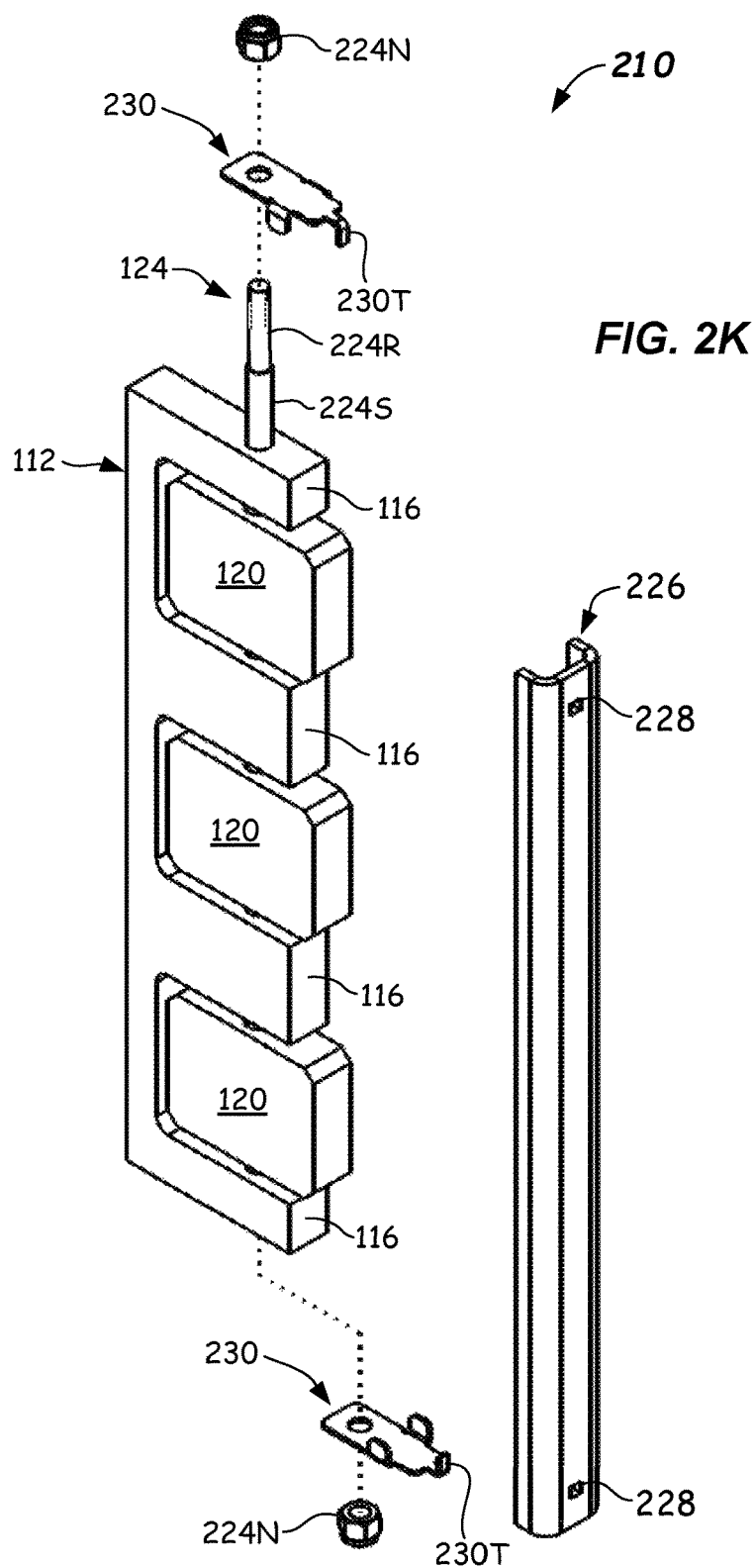

BUS BRACE APPARATUS, BUS ASSEMBLIES, AND METHODS OF BRACING BUS BARS

FIELD

The present disclosure relates to apparatus, assemblies, and methods for electrical power distribution, and specifically to bracing of bus bars, such as horizontal bus bars.

BACKGROUND

In switchgear and switchboard systems, horizontal buses, such as A-, B-, and C-phase horizontal buses can connect between various electrical components within an enclosure. For example, in one implementation, horizontal buses can connect between a first vertical bus in one area of the enclosure and another vertical bus located at another area of the enclosure. These horizontal buses can carry A-, B-, and C-phase line current and can be interconnected to three-phase line power, for example.

In such switchgear and switchboard systems, it is desired to move the components as close together as possible to minimize overall space envelope. Such close proximity of various buses, such as horizontal buses under normal operating conditions is not problematic. However, such close proximity during a short-circuit event can cause substantial forces and bending of various components. If such bending is sufficiently large, it could be possible to have phase-to-phase short circuits or undesirable arcing. Forces encountered during such short-circuit events are approximately inversely proportional to the spacing between the various bus bars and can be quite large.

Thus, there is a need to improve bus assemblies to improve strength thereof and allow close proximity positioning of the bus bars therein.

SUMMARY

According to a first embodiment, a bus brace apparatus is provided. The bus brace apparatus comprises a bracing block having a plurality of bus bar-receiving recesses configured to receive bus bars therein and a plurality of legs defining sides of the plurality of bus-receiving recesses, the legs including first apertures formed there through, an insulating positioner received in each of the plurality of bus bar-receiving recesses, each of the insulating positioners including a second aperture formed therein, a fastener extending through each of the first apertures and each of the second apertures and aligning each of the insulating positioners within respective ones of the plurality of bus bar-receiving recesses, and a channel member coupled to the bracing block and including first longitudinal side and a second longitudinal side each configured to interface with a surface of each of the insulating positioners and limit rotation of the insulating positioners about the fastener.

According to another embodiment, a bus assembly is provided. The horizontal bus assembly comprises a bus comprising a first bus bar, a second bus bar, and a third bus bar; a first bus support configured to support each of the first, second, and third bus bars at a first end; second bus supports configured to support each of the first, second, and third bus bars at a second end; and a bus brace apparatus, comprising: a bracing block having a plurality of bus bar-receiving recesses configured to receive bus bars therein and a plurality of legs defining sides of the plurality of bus-receiving recesses, the legs including first apertures formed there through, an insulating positioner received in each of the plurality of bus bar-receiving recesses, each of the insulating positioners including a second aperture formed therein, a fastener extending through each of the first apertures and each of the second apertures and aligning each of the insulating positioners within respective ones of the plurality of bus bar-receiving recesses, and a channel member coupled to the bracing block and including first longitudinal side and a second longitudinal side each configured to interface with a surface of each of the insulating positioners and limit rotation of the insulating positioners about the fastener.

According to another embodiment, a method of bracing bus bars, such as horizontal bus bars, is provided. The method includes providing a first bus bar, a second bus bar, and a third bus bar; providing a bus brace apparatus comprising a bracing block having a plurality of bus bar-receiving recesses, a plurality of legs defining sides of the plurality of bus-receiving recesses, the legs including first apertures formed there through; an insulating positioner received in each of the plurality of bus bar-receiving recesses, each of the insulating positioners including a second aperture formed therein and side surfaces; a fastener extending through each of the first apertures and each of the second apertures and aligning each of the insulating positioners within respective ones of the plurality of bus bar-receiving recesses, and a channel member coupled to the bracing block and including first longitudinal side and a second longitudinal side; receiving the first bus bar, the second bus bar, and the third bus bar in respective ones of the plurality of bus bar-receiving recesses; and interfacing the side surface of each of the insulating positioners with the first longitudinal side and the second longitudinal side of the channel member to limit rotation of the insulating positioners about the fastener.

Still other aspects, features, and advantages of the present disclosure may be readily apparent from the following description by illustrating a number of example embodiments, including the best mode contemplated for carrying out the present disclosure. The present invention may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

FIG. 2J illustrates an end plan view of the channel member showing a C-shaped cross section and the overlapping interface with the sides of the insulating positioner according to one or more embodiments of the disclosure.

FIG. 2K illustrates an exploded perspective view of a bus brace apparatus and components thereof according to one or more embodiments of the disclosure.

DETAILED DESCRIPTION

Reference will now be made in detail to the embodiments of this disclosure, examples of which are illustrated in the accompanying drawings. The aforementioned problems of prior art electrical bus assemblies can be overcome by one or more embodiments of the present disclosure. In particular, the use of the inventive electrical bus assemblies, bus brace apparatus, and methods of bracing electrical bus bars can provide substantially rigid and adequately supported bus structures, such as horizontal electrical bus assemblies. Further, bus brace apparatus that are configured in the prior art to receive multi-piece electrical bus bars can be readily adapted to support single-piece bus bars using the inventive bus brace apparatus. As such, minimal motion of the various supported electrical bus bars, such as A-, B-, and C-phase horizontal bus bars, can be provided when high-current, short-circuit events are encountered. In particular, motion of supported single-piece bus bars during such short circuits events can be minimized, such as when large attraction or repulsion forces may be present. Such large forces can act between various phase, single-piece horizontal bus bars or between such single-piece horizontal bus bars and other closely situated bus bars.

In one embodiment, a bus brace apparatus is provided. The bus brace apparatus is configured to be used in embodiments having relatively lower current ratings wherein single-piece bus bars (e.g., single-piece A-, B-, and C-phase bus bars) can be used.

Figures 1A, 1B:
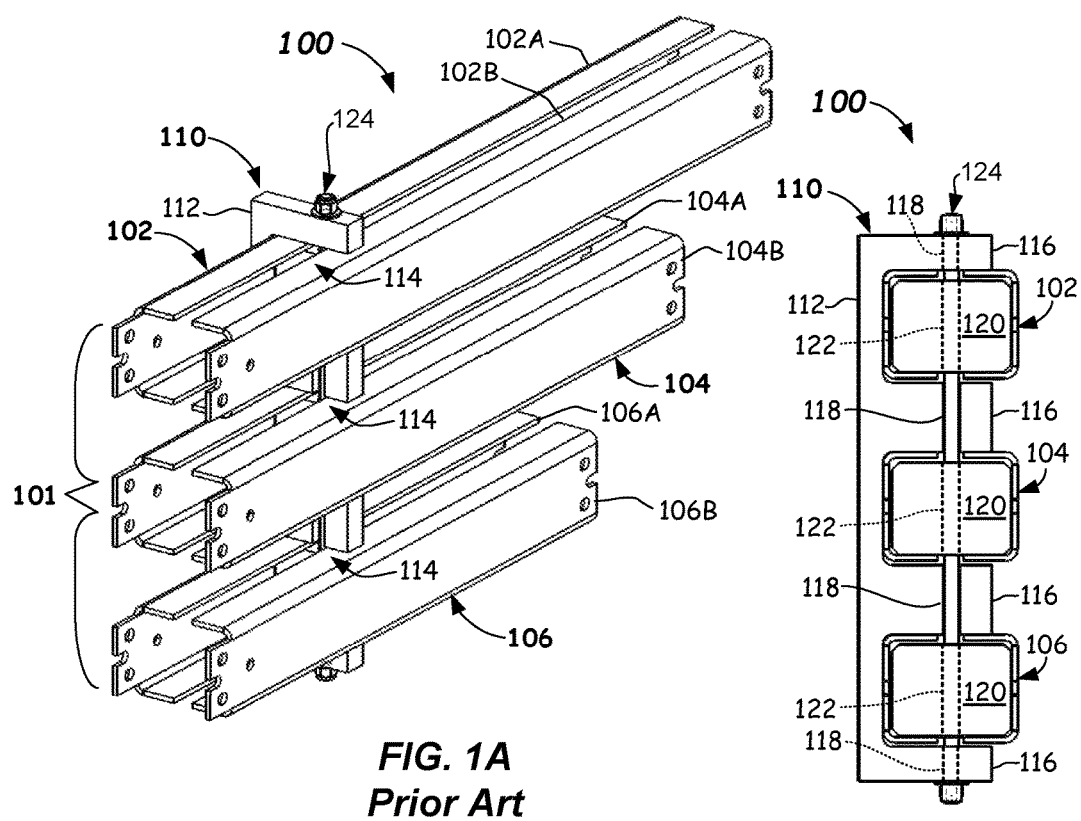
FIGS. 1A and 1B illustrate perspective and side plan views, respectively, of an electrical bus assembly according to the prior art.

Certain applications require longer a bus, and a longer bus span. Meeting UL requirements in such longer spans formerly was achieved by using a double bus bar arrangement as shown in FIGS. 1A & 1B, which could withstand a short circuit event. The single-piece (single channel) bus design described herein including the bus brace apparatus could be useful at least up to 100 KA and for 800 A to about 2,000 A continuous current applications. The bus brace apparatus includes a bracing block having a plurality of bus bar-receiving recesses configured to receive single-piece bus bars therein, and a plurality of legs (e.g., horizontally-extending legs) defining sides of the plurality of bus-receiving recesses. The legs can include first apertures formed there through (e.g., vertically there through).

The bus brace apparatus further includes an insulating positioner received in each of the plurality of bus bar-receiving recesses, and each of the insulating positioners can include a second aperture formed therein. A fastener can extend through each of the first apertures and each of the second apertures and align each of the insulating positioners within respective ones of the plurality of bus bar-receiving recesses.

To support the single-piece bus bars and prevent the insulating positioners from rotating within the bus bar-receiving recesses and inside of the bus bars, a channel member is coupled to the bracing block. The channel member can include one or more sides, such as a first longitudinal side and a second longitudinal side, wherein each side is configured to interface with a surface (e.g., a side surface) of each of the plurality of insulating positioners and thereby limit rotation of the insulating positioners about the fastener (e.g., about an axial axis thereof.)

In another aspect, an electrical bus assembly is provided. The electrical bus assembly can include multiple bus bars, such as a first bus bar, a second bus bar, and a third bus bar. The respective bus bars can be single-piece A-, B-, and C-phase bus bars, and can be configured as horizontal bus bars in use, i.e., they can be oriented horizontally. A first bus support structure can be configured to support each of the first, second, and third bus bars at a first end. A second bus support structure can be configured to support each of the first, second, and third bus bars at a second end. The bus support structures can be insulating supports on one end and can comprise vertical bus bars on another end, for example. A bus brace apparatus, as described above, can be positioned in between the first bus support and the second bus supports and can brace and maintain spacing between the respective single-piece bus bars as well as prevent rotation of the insulating positioners therein.

Methods of bracing bus bars, such as single-piece bus bars, are also provided. The methods include providing a first bus bar, a second bus bar, and a third bus bar, providing a bus brace apparatus (as described herein), and interfacing respective surfaces (e.g., side surfaces) of each of the insulating positioners with the first longitudinal side and the second longitudinal side of the channel member to limit rotation of the insulating positioners.

One or more embodiments of the disclosure will now be explained in greater detail with reference to FIGS. 2A-4 below. FIGS. 1A and 1B illustrate an electrical bus assembly 100 according to the prior art that includes a bus brace apparatus 110 that is configured to support multi-piece bus bars, wherein each bus bar is made up of two pieces, such as the opposing C-shaped bus bar halves of an A-phase bus bar 102, B-phase bus bar 104, and C-phase bus bar 106, as shown. The bus brace apparatus 110 includes a bracing block 112, which is an insulator, having a plurality of bus bar-receiving recesses 114 formed therein. The bus bar-receiving recesses 114 are configured to receive multi-piece bus bars 102, 104, 106 therein. The bracing block 112 includes a plurality of legs 116 defining sides of the plurality of bus-receiving recesses 114, the legs 116 including first apertures 118 formed there through. Insulating positioners 120 are received in each of the plurality of bus bar-receiving recesses 114, and wherein each of the insulating positioners 120 includes a second aperture 122 (a slot or groove) formed therein. A fastener 124 extends through each of the first apertures 118 and each of the second apertures 122 and aligns each of the insulating positioners 120 within respective ones of the plurality of bus bar-receiving recesses 114. In the multi-piece configuration, the insulating positioners 120 are prevented from rotation by the respective halves 102A, 102B; 104A, 104B; and 106A, 106B of the bus bars 102, 104, 106.

Figure 2A:
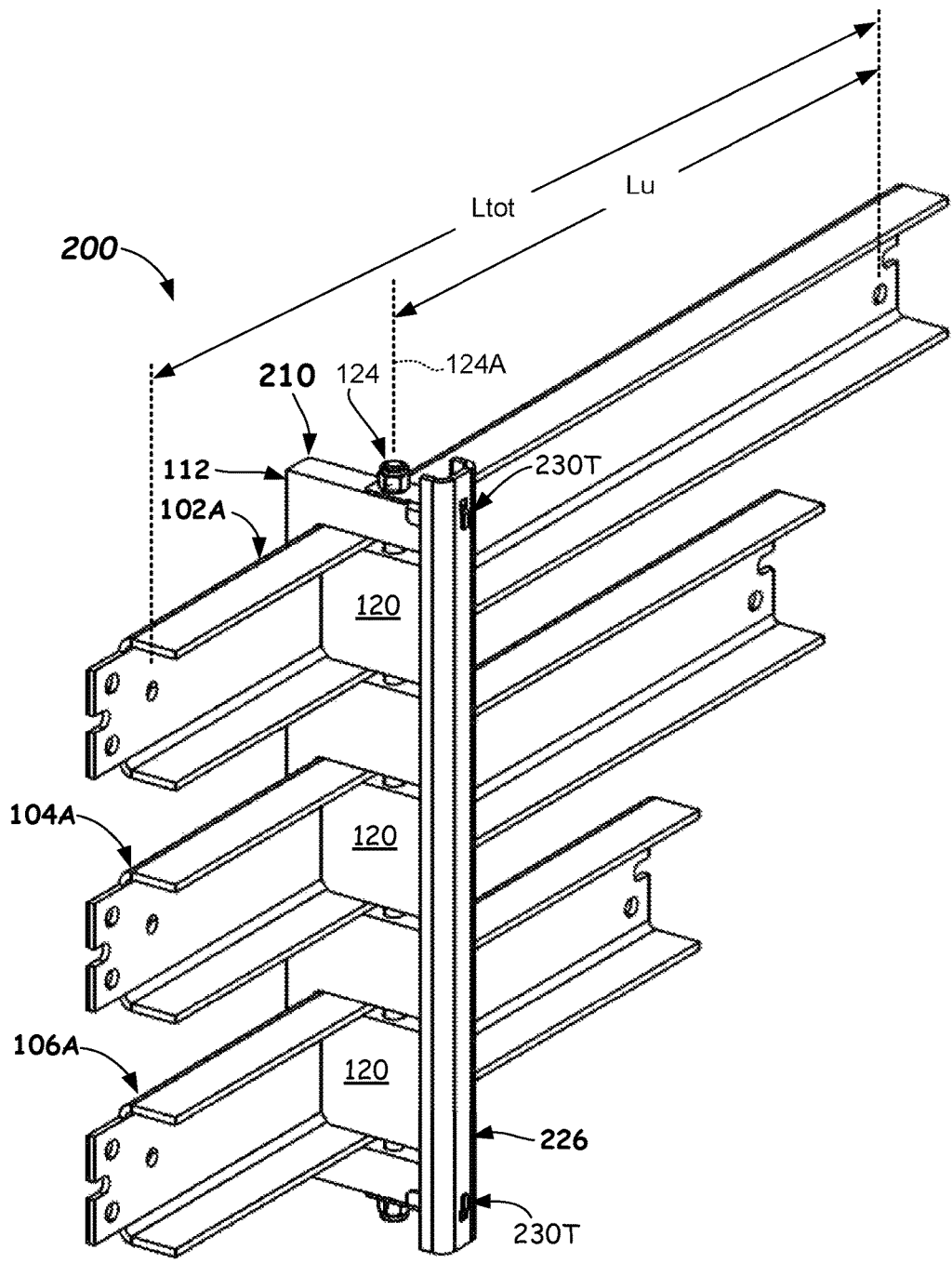
FIG. 2A illustrates a perspective view of a bus assembly configured as a horizontal electrical bus assembly including bracing with a bus brace apparatus according to one or more embodiments of the disclosure.
Figure 2B:
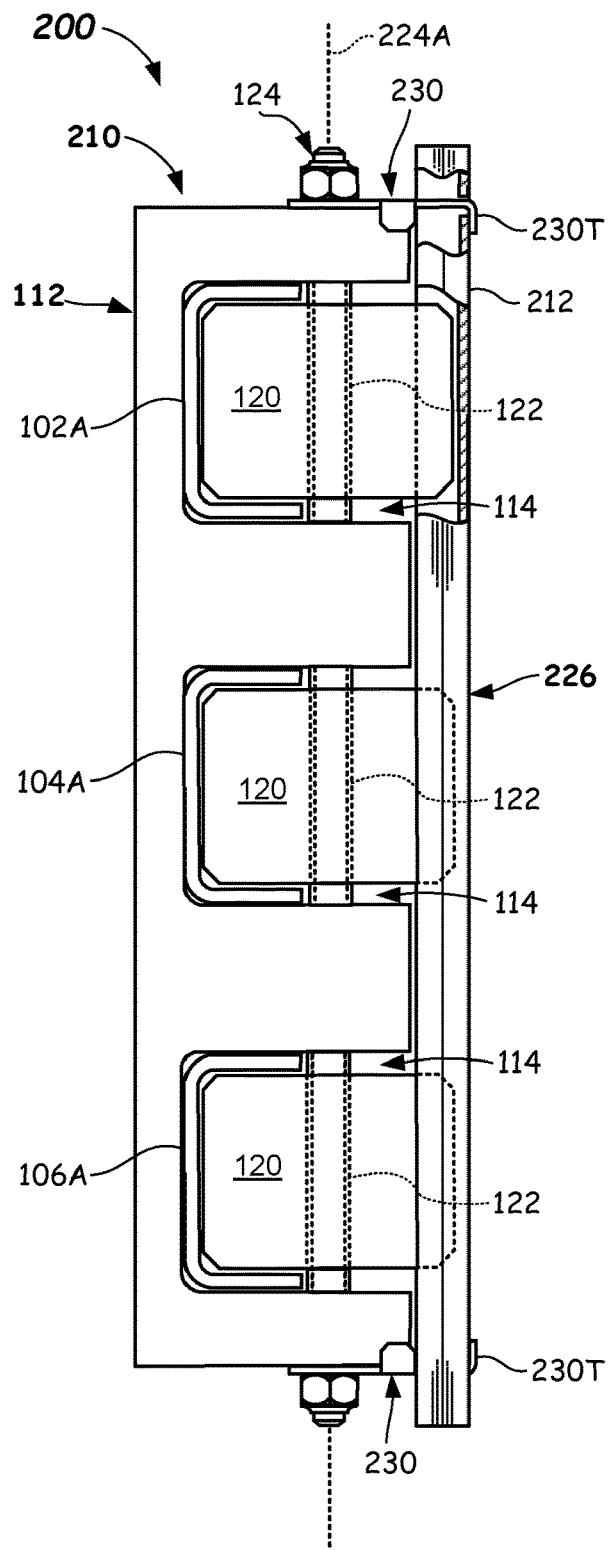
FIG. 2B illustrates a side plan view of a bus assembly shown with cutout sections in a channel member of the bus brace apparatus according to one or more embodiments of the disclosure.
Figure 2C:
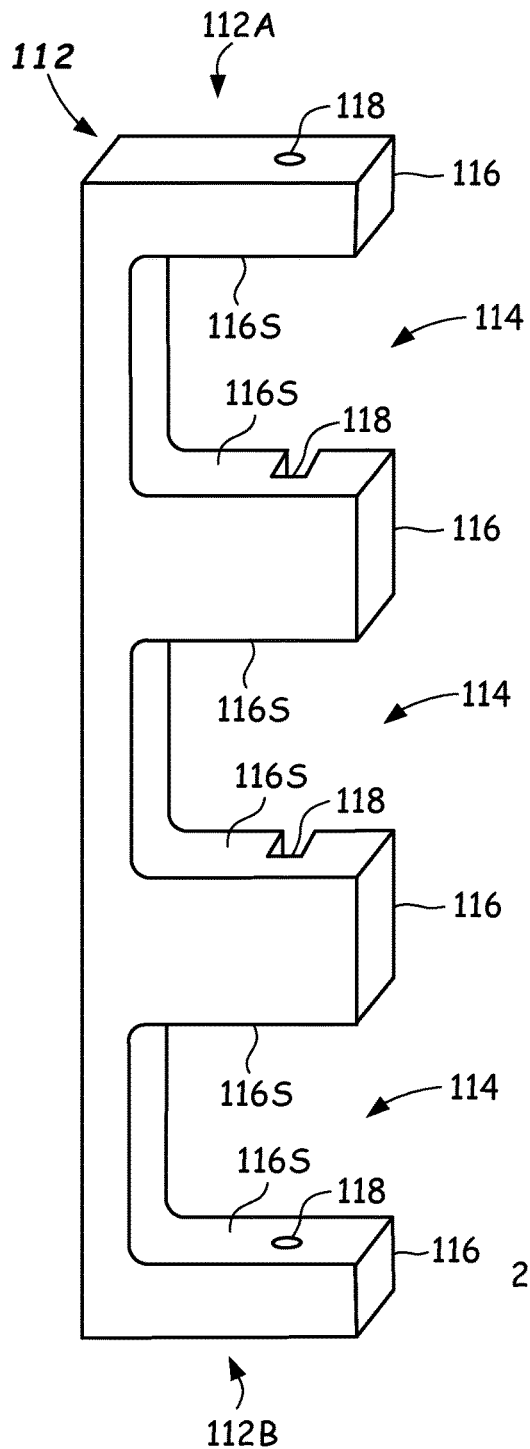
FIG. 2C illustrates a side perspective view of a bracing block according to one or more embodiments of the disclosure.
Figure 2D:
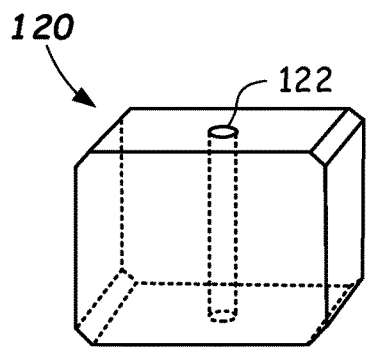
FIG. 2D illustrates a perspective view of an insulating positioner according to one or more embodiments of the disclosure.
Figure 2E:
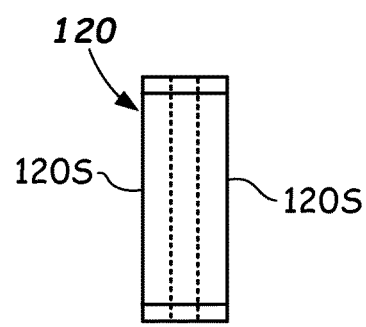
FIG. 2E illustrates a side plan view of an insulating positioner according to one or more embodiments of the disclosure.
Figure 2F:
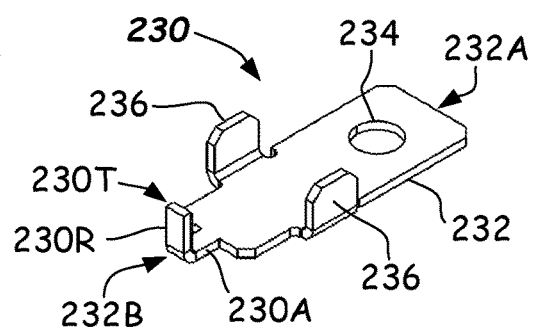
FIG. 2F illustrates a perspective view of a lock bracket according to one or more embodiments of the disclosure.
Figures 2G, 2H, 2I:
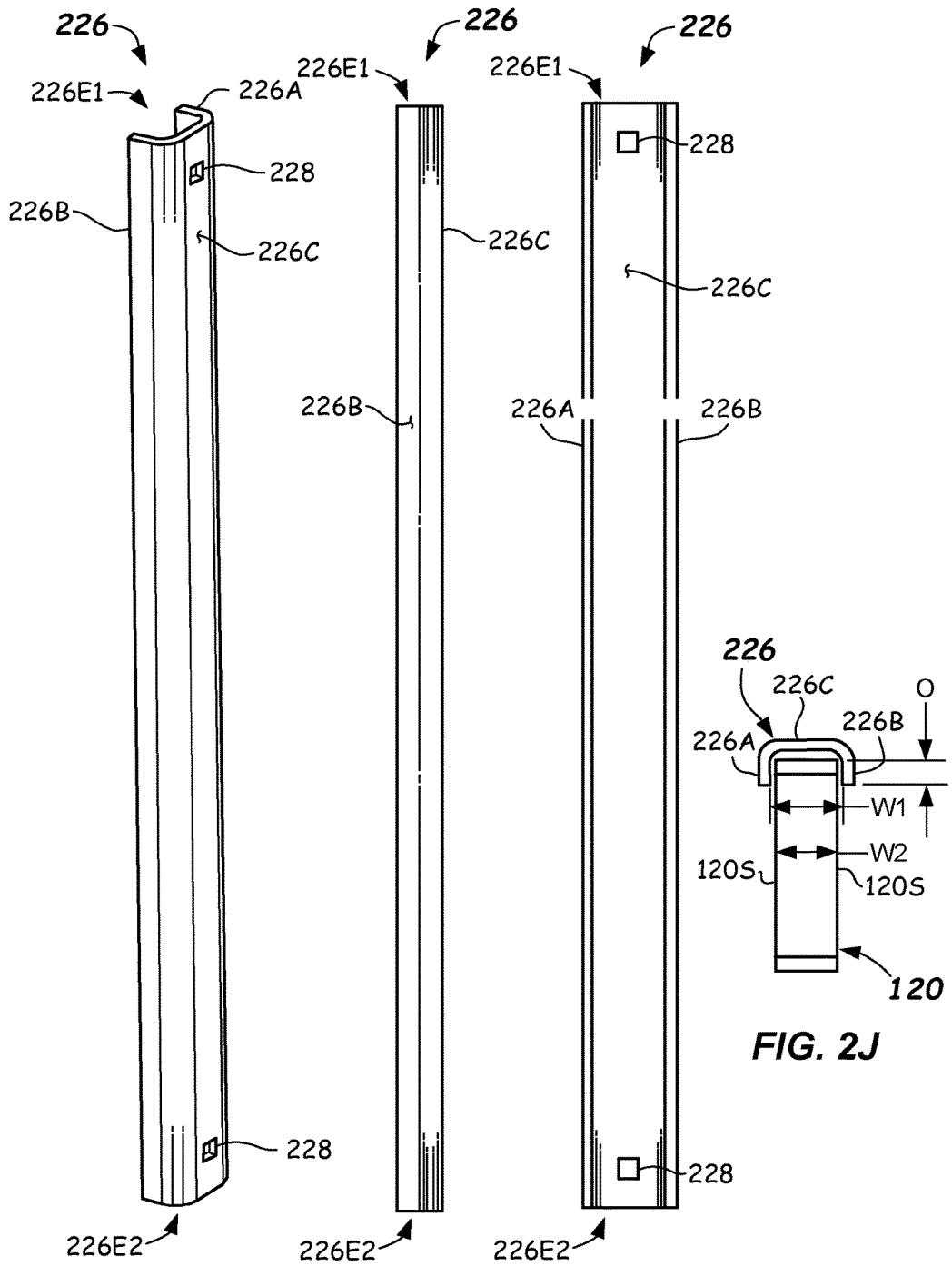
FIG. 2G illustrates a perspective view of a channel member according to one or more embodiments of the disclosure.
FIG. 2H illustrates a side plan view of the channel member according to one or more embodiments of the disclosure.
FIG. 2I illustrates a rear plan view of the channel member according to one or more embodiments of the disclosure.
Figure 3:
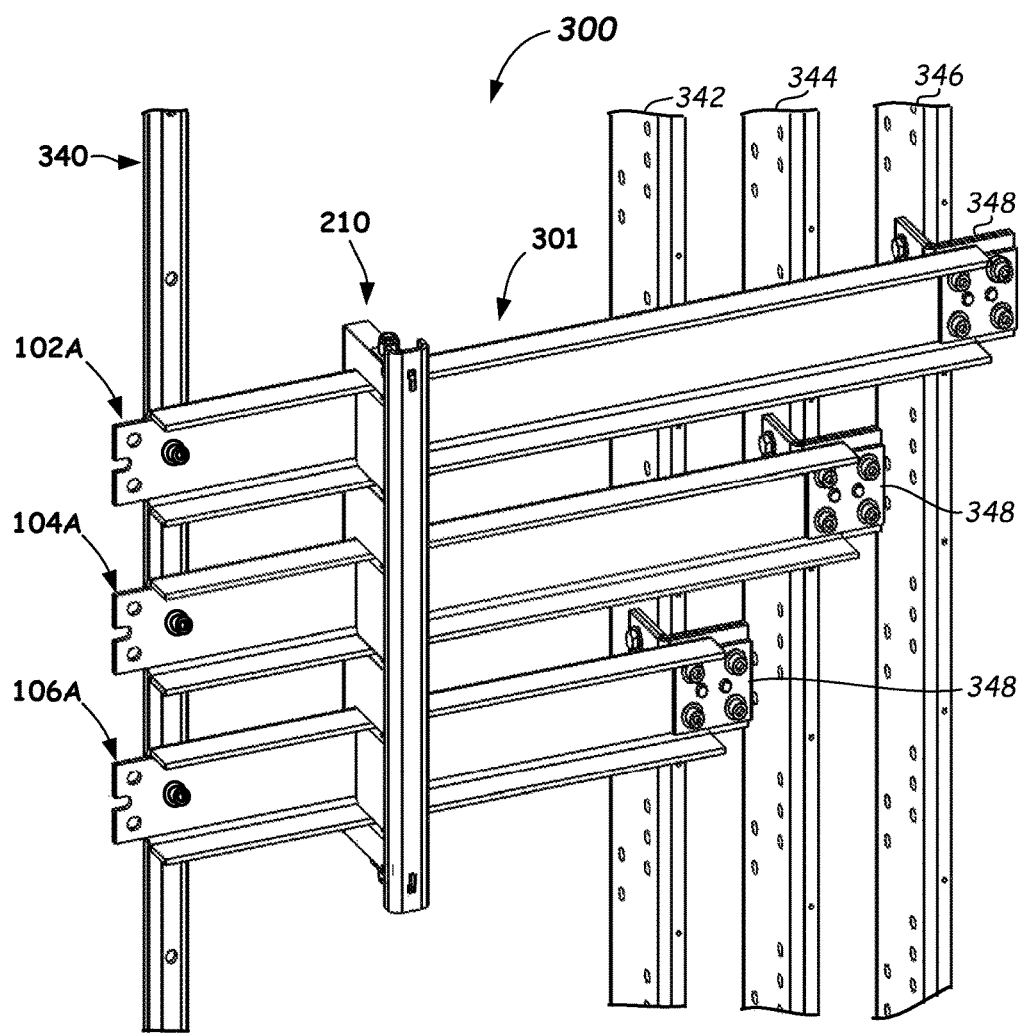
FIG. 3 illustrates a perspective view of a bus assembly, configured as a braced and supported horizontal bus assembly, shown installed in a portion of a switchgear assembly according to one or more embodiments of the disclosure (enclosure not shown for clarity).
Figure 4:
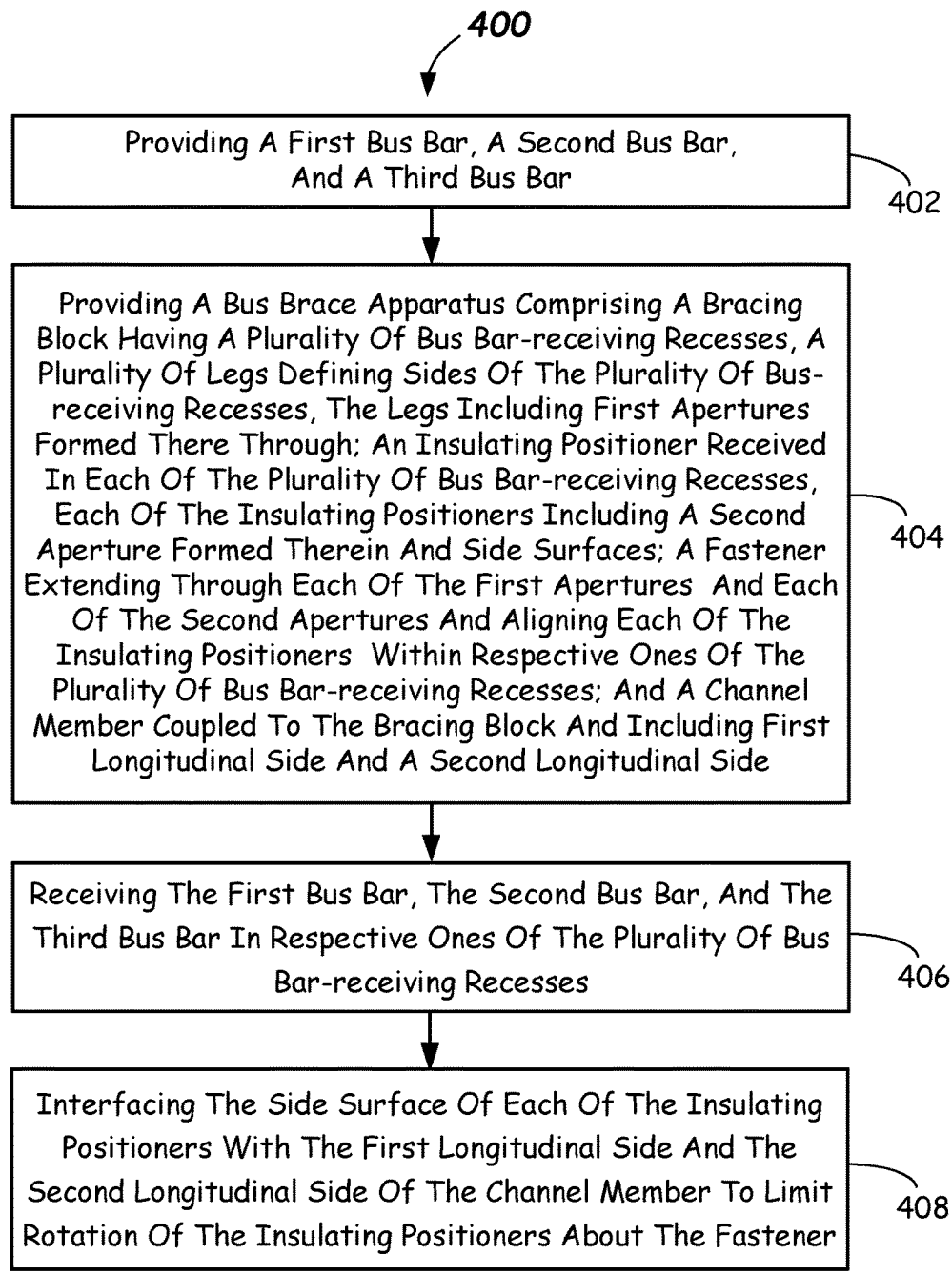
FIG. 4 illustrates a flowchart of a method of bracing bus bars according to embodiments of the disclosure.

FIGS. 2A-3 illustrate one or more embodiments of the bus brace apparatus 210 configured to brace single piece bus bars and subcomponents thereof, electrical bus bar assemblies 200, and supported and braced electrical bus assemblies 300 that can be used within an electrical power distribution enclosure (e.g., a switchgear cabinet not shown). FIG. 4 illustrates a method of bracing bus bars, such as single-piece bus bars.

Now referring to FIG. 2A, a bus brace apparatus 210 is shown in a bus bar assembly 200. The bus brace apparatus 210 can be provided along the lengths of the respective first electrical bus bar 102A, the second electrical bus bar 104A, and the third bus bar 106A. For example, the bus brace apparatus 210 can be installed along the lengths of the respective bus bars 102A, 104A, 106A, such that the unsupported length Lu is less than or equal to 50% of the total length Ltot, where Lu is the unsupported length from the farthest support location to the bus brace apparatus 210 and the total length Ltot is the total length between supported locations of the bus assembly closest to the bus brace apparatus 210.

The bus bars 102A, 104A, 106A can be horizontal bus bars that run between the vertical bus bars and line power (or between other bus structures), and can be made of a highly-conductive material, such as copper, coated copper, aluminum, and the like. The bus bars 102A, 104A, 106A can include a bent cross sectional shape, such as a C-shape in cross section. The bus bars 102A, 104A, 106A may include this same C-shaped profile along a length thereof, except at the ends, which may include fastening structures configured to couple to other support structures, such as insulating supports or other bus bars. As shown, the bus brace apparatus 210 can be installed onto the buses 102A, 104A, 106A and secured to provide bracing between the respective bus bars 102A, 104A, 106A.

In more detail, a bus brace apparatus 210 and components thereof will be fully described with reference to FIGS. 2A through 2K. The bus brace apparatus 210 can be used to brace respective bus bars 102A, 104A, 106A relative to one another and limit relative motion thereof during transient short circuit events. The bus brace apparatus 210 can be used to brace bus bars 102A, 104A, 106A in applications where the bus bars 102A, 104A, 106A are single piece and can have up to a 100,000 A Short-Time Withstand Rating, for example. Thus, the bus brace apparatus 210 can be used in other applications such as for 65 kA, 85 kA, or even 150 kA Short-Time Withstand Rating, if appropriately sized.

The bus brace apparatus 210 comprises a bracing block 112 of the same configuration as in the prior art having a plurality of bus bar-receiving recesses 114 of a size and shape configured to receive bus bars 202, 204, 206 of the prior art (e.g., multi-piece bus bars) therein and a plurality of legs 116 defining sides 116S of the plurality of bus-receiving recesses 114, wherein the legs including first apertures 118 formed there through. The apertures 118 can be holes or slots or combinations thereof as shown. The bracing block 112 can be used interchangeably to brace multi-piece bus bars 102, 104, 106 of the prior art, but also is configured to brace single-piece bus bars 102A, 104A, 106A. In a preferred implementation, the bus bars 102A, 104A, 106A are configured as horizontal bus bars in use, i.e., they are oriented with the length dimension (longest dimension) oriented horizontally. As in the prior art, the bus brace apparatus 210 comprises an insulating positioner 120 received in each of the plurality of bus bar-receiving recesses 114. Each of the insulating positioners 120 includes a second aperture 122 formed therein. Second aperture 122 can be a hole or the like.

A fastener 124 is provided and extends through each of the first apertures 118 and each of the second apertures 122 and aligns each of the insulating positioners 120 within respective ones of the plurality of bus bar-receiving recesses 114.

The bus brace apparatus 210 further comprises a channel member 226 coupled to the bracing block 112. The channel member 226 can be made of an insulating material, such as a polyester resin with fiberglass reinforcement, such as from GP03 fiberglass National Electrical Manufacturers Association (NEMA) sheet. The insulating positioners 120 can also be made of an insulating material, such as the same insulating material described above. The channel member 226 can include one or more sides and can include a first longitudinal side 226A and a second longitudinal side 226B, each being suitably configured to interface with each of the insulating positioners 120 and function to limit rotation of the insulating positioners 120 about the fastener 124. In particular, the channel member 226 can interface with a surface 120S of each of the insulating positioners 120 and limit rotation of the insulating positioners 120 about an axial axis 224A of the fastener 124. For example, the respective first longitudinal side 226A and second longitudinal side 226B may be parallel to one another and can be co-planar to one another and may each limit rotation of the insulating positioners 120 by coming into contact with the respective first longitudinal side 226A and second longitudinal side 226B as the insulating positioners 120 attempt to rotate in the bus bar-receiving recesses 114. Thus, the insulating positioners 120 are retained in a substantially perpendicular orientation relative to the bus bars 102A, 104A, 106A.

The channel member 226 can comprise a U-shaped cross-section along a length thereof as shown in FIGS. 2G and 2J. The first longitudinal side 226A and the second longitudinal side 226B of the channel member 226 should overlap the surface 120S (e.g., the side surfaces) of each of the insulating positioners 120 by an overlap distance "O" of at least 10 mm as shown in FIG. 2J. For example, the overlap distance O can range between about 10 mm and 18 mm. Other overlap distances may be used as long as rotation is limited. The inside width W1 of the channel member 226 can closely conform to the outside width W2 of the insulating positioners 120. For example, W1-W2 (the gap) can range from about zero (e.g., a line fit) to about 6 mm, but for ease of assembly the gap should be between about 5 mm and 10 mm, for example. Other suitable W1 and W2 dimensions and gaps may be used as long as rotation is limited. By way of example, and not by limitation, W1 can be from about 30 mm to about 45 mm, and W2 can be from about 25 mm to 38 mm.

The channel member 226 comprises a connecting side 226C interconnecting between the first and second longitudinal sides 226A, 226B. The first and second longitudinal sides 226A, 226B may be about 25 mm wide whereas the connecting side 226C may be about 50 mm in width. Other dimension can be used. As best shown in FIGS. 2B, 2G, and 2I the connecting side 226C can comprise one or more tab receivers 228. The one or more tab receivers 228 are configured to receive one or more locking tabs 230T of a lock bracket 230 (FIG. 2F) therein. In the embodiment shown, the one or more tab receivers 228 comprise two tab receivers, one situated on each end of the channel member 226. Each of the two tab receivers 228 can be configured to receive a locking tab 230T therein. The one or more tab receivers 228 can comprise any suitable shape adapted to receive a locking tab 230T therein. For example, the one or more tab receivers 228 can comprise a rectangular or square hole. Other suitable shapes, such as a round hole may be used. The channel member 226 may be an insulating material. For example, the channel member 226 may be a glass-filled polyester material. The channel member 226 can be formed by pultruding through a heated die to achieve the final cross-sectional shape. In the depicted channel member 226, the connecting side 226C interconnecting between the longitudinal sides 226A, 226B comprises a first tab receiver 228 on a first end 226E1 and a second tab receiver 228 on a second end 226E2.

As best shown in FIGS. 2B and 2F, the bus brace apparatus 210 further comprises one or more lock brackets 230. The lock brackets 230 can be coupled to the bracing block 112 and to the channel member 226 to secure them together. For example, the one or more lock brackets 230 can comprise a body portion 232 having an aperture 234 formed therein, which is configured to receive the fastener 124 through the aperture 234 and the bracing block 112. The one or more lock brackets 230 can further comprise extending tabs 236 spaced on either side of the bracing block 112 so as to straddle the bracing block 112. The extending tabs 236 may a length extending vertically alongside of the bracing block 112 by about 12 mm to 20 mm, and may have a horizontal width alongside of the bracing block 112 of about 10 mm to 25 mm, and may have a gap dimension between them that can be from a line fit to a gap of about 2 mm, for example, as compared to the width W2 of the bracing block 112. Other suitable gaps and dimension can be used. The extending tabs 236 should be located proximate the ends of the uppermost and lowermost legs 116 of the bracing block 112 so as to maximize through air and over surface distance.

In more detail, the one or more lock brackets 230 can comprise the body portion 232 having the aperture 234 formed therein on a first end 232A, the locking tab 230T on a second end 232B, and the extending tabs 236 spaced on either side of the body portion 232 in between the first end 232A and the second end 232B. In the depicted embodiment, the extending tabs 236 and the locking tab 230T project at an approximately 90 degree angle from a plane of the body portion 232. Variations of up to +/−45 degrees could be used. Any suitable variation can be used provided that an acceptable locking and anti-rotation function is retained. As shown, the extending tabs 236 and the locking tab 230T can project from the body portion 232 in a same direction. As depicted, the locking tab 230T includes a retaining end 230R and an aligning portion 230A. The aligning portion 230A can extend parallel to a plane of the body portion 232 and is configured to be received within the tab receivers 228. The aligning portion 230A can have a longitudinal length from about 11 mm to 15 mm and about 6 mm to 26 mm wide. The tab receivers 228 can have a square- or rectangular-shaped opening having a height sufficiently large to allow the locking tab 230T to be inserted therein by rocking and lock therewith. For example, the tab receivers 228 can have a 9 mm height and from about 8 mm to 25 mm wide, such as 9 mm by 9 mm opening therein. The retaining end 230R can be from about 12 mm to 20 mm long in vertical height. The vertical length of the retaining end 230R should be longer than the height of the tab receiver 228, so that rocking is used to insert the respective retaining end 230R in the respective tab receiver 228. The Other suitable sizes and shapes may be used. The one or more lock brackets 230 can be made of a stamped metal, such as steel. Other suitably rigid materials could be used, such as aluminum, or an engineered plastic, such as acrylonitrile butadiene styrene (ABS).

As shown, the one or more lock brackets comprises two lock brackets 230 and each can comprise a body portion 232, extending tabs 236, and a locking tab 230T, and wherein the retaining end 230R of the locking tab 230T of each of the two lock brackets 230 can be oriented to project towards one another. In another option, the retaining ends 230R may project away from one another. The two lock brackets 230 can be identical.

As depicted, the bus brace apparatus 210 comprising the one or more lock brackets 230 comprises a first lock bracket 230 coupled to a first end 112A of the bracing block 112 and a second lock bracket 230 coupled to a second end 112B of the bracing block 112. The first lock bracket 230 and the second lock bracket 230 may be couple to endmost ones of the plurality of legs 116. However, the first lock bracket 230 and the second lock bracket 230 may be positioned elsewhere, such as in a space between an insulating positioner 120 and any leg 116.

As shown, the first lock bracket 230 is coupled to a first end 112A of the bracing block 112 and a second lock bracket 230 coupled to the second end 112B of the bracing block 112 and the coupling is accomplished by the fastener 124. In the depicted embodiment, as best shown in FIGS. 2B and 2K, the fastener 124 can be made up of a threaded rod 224R, and nuts 224N, such as lock nuts. Lock nuts may be torqued between 6-10 Nm (5-7 lb-ft), for example. Other values can be used. A sleeve 224S may be inserted over the threaded rod 224R. Sleeve 224S may be made of an insulating material such as plastic, and may extend fully from the uppermost leg 116 to the lowermost leg 116 when oriented as shown in FIG. 2K.

In accordance with another embodiment, a bus assembly 300 including the bus brace apparatus 210 is shown and described with reference to FIG. 3. The bus assembly 300 comprises a bus 101 comprising the first bus bar 102A, a second bus bar 102B, and a third bus bar 102C. Each of the bus bars 102A, 104A, 106A shown can be single-piece bus bars, as shown including a C-shaped profile along a length thereof (excepting the attachment portions at the ends thereof). The bus assembly 300 can comprise a first bus support 340 configured to support each of the first bus bar 102A, second bus bar 104A, and third bus bar 104C at respective first ends thereof. First bus support 340 may be an insulator and the respective first bus bar 102A, second bus bar 104A, and third bus bar 104C can connect to the first bus support 340 by suitable fasteners, such as bolts or screws.

The bus assembly 300 can further comprise second bus supports 342, 344, 346 configured to support each of the first bus bar 102A, second bus bar 104A, and third bus bar 106A (e.g., horizontal bus bars) at a second end thereof. In the depicted embodiment, the second bus supports 342, 344, 346 can be embodied as vertical bus bars (shown truncated). The vertical bus bars are configured to carry A-, B-, and C-phase electrical current to main or branch circuit breakers, for example. The second bus supports 342, 344, 346 can be connected to the first bus bar 102A, second bus bar 104A, and third bus bar 106A using brackets 348 or other suitable electrical connection.

The bus brace apparatus 210 is as shown and described in FIGS. 2A-2K, and is positioned between the first bus support 340 and the second bus supports 342, 344, 346. The bus brace apparatus 210 comprises a bracing block 112 having a plurality of bus bar-receiving recesses 114 configured to receive the single-piece bus bars 102A, 104A, 106A, insulating positioners 120 received in the bus bar-receiving recesses 114, a fastener 124 extending through the bracing block 112 and insulating positioners 120 and aligning each of the insulating positioners 120 within respective bus bar-receiving recesses 114. The channel member 226 attaches to the bracing block 112 and has longitudinal sides 226A, 226B configured to interface with surfaces 120S of the insulating positioners 120. The interface limits rotation of the insulating positioners 120 about the fastener 124. For example, the interface can limit rotation to less than about 3 degrees about the axial axis 124A of the fastener 124. The bus brace apparatus 210 can be positioned at a location that provides at least a minimum level of support for the bus 301, as discussed above. One or more than one of the bus brace apparatus 210 can be used on a span of the first bus bar 102A, second bus bar 104A, and third bus bar 106A (e.g., horizontal bus bars). Likewise, although three bus receiving recesses 114 are shown in the bus brace apparatus 210, more or less numbers of such bus receiving recesses 114 could be used.

FIG. 4 illustrates a method 400 of supporting electrical bus bars (e.g., horizontal bus bars). The method 400, comprises, in 402, providing a first bus bar (e.g., first bus bar 102A that can be a horizontal bus bar), a second bus bar (e.g., second bus bar 104A that can be a horizontal bus bar), and a third bus bar (e.g., third bus bar 106A that can be a horizontal bus bar).

The method 400 further comprises, in 404, providing a bus brace apparatus (e.g., bus brace apparatus 210) comprising a bracing block (e.g., bracing block 112) having a plurality of bus bar-receiving recesses (e.g., bus bar-receiving recesses 114), a plurality of legs (e.g., legs 116) defining sides (side 116S) of the plurality of bus-receiving recesses (e.g., bus-receiving recesses 114), the legs (e.g., legs 116) including first apertures (e.g., first apertures 118) formed there through; an insulating positioner (e.g., insulating positioner 120) received in each of the plurality of bus bar-receiving recesses (e.g., bus bar-receiving recesses 114), each of the insulating positioners (e.g., insulating positioner s120) including a second aperture (e.g., second aperture 122) formed therein and side surfaces (e.g., side surfaces 120S), a fastener (e.g., fastener 124) extending through each of the first apertures (e.g., first apertures 118) and each of the second apertures 122 and aligning each of the insulating positioners 120 within respective ones of the plurality of bus bar-receiving recesses (e.g., bus bar-receiving recesses 114); and a channel member (e.g., channel member 226) coupled to the bracing block (e.g., bracing block 112) and including first longitudinal side 226A and a second longitudinal side 226B.

Further, the method 400 includes, in 406, receiving the first bus bar (e.g., first bus bar 102A), the second bus bar (e.g., second bus bar 104A), and the third bus bar (e.g., third bus bar 106A), in respective ones of the plurality of bus bar-receiving recesses (e.g., bus bar-receiving recesses 114), and, in 408, interfacing the side surfaces 120S of each of the insulating positioners 120 with the first longitudinal side 226A and the second longitudinal side 226B of the channel member 226 to limit rotation of the insulating positioners 120 about the fastener 124. The interfacing, although shown with outside surface, could alternatively be with any side surfaces of the insulating positioners 120 so long as rotation can be restrained.

It should be readily appreciated by those persons of ordinary skill in the art that the present invention is susceptible of broad utility and application. Many embodiments and adaptations of the present disclosure other than those herein described, as well as many variations, modifications, and equivalent arrangements, will be apparent from, or reasonably suggested by, the present disclosure. Accordingly, while the present invention has been described herein in detail in relation to specific embodiments, it is to be understood that this disclosure is only illustrative and presents examples merely for purposes of providing a full and enabling disclosure. This disclosure is not intended to limit the invention to the particular apparatus, assemblies, and/or methods disclosed, but, to the contrary, the intention is to cover all modifications, equivalents, and alternatives falling within the scope of the claims.

What is claimed is:

1. A bus brace apparatus, comprising:
   a bracing block having a plurality of bus bar-receiving recesses configured to receive bus bars therein and a plurality of legs defining sides of the plurality of bus-receiving recesses, the legs including first apertures formed there through;
   an insulating positioner received in each of the plurality of bus bar-receiving recesses, each of the insulating positioners including a second aperture formed therein;
   a fastener extending through each of the first apertures and each of the second apertures and aligning each of the insulating positioners within respective ones of the plurality of bus bar-receiving recesses; and
   a channel member coupled to the bracing block and including first longitudinal side and a second longitudinal side each configured to interface with a surface of each of the insulating positioners and limit rotation of the insulating positioners about the fastener.

2. The bus brace apparatus of claim 1, wherein the channel member comprises a U-shaped cross-section along a length thereof.

3. The bus brace apparatus of claim 1, wherein the first longitudinal side and the second longitudinal side of the channel member overlap the surface of each of the insulating positioners by at least 10 mm.

4. The bus brace apparatus of claim 1, wherein the channel member comprises a connecting side interconnecting between the first longitudinal side and the second longitudinal side, and wherein the connecting side comprises one or more tab receivers formed therein.

5. The bus brace apparatus of claim 4, wherein the one or more tab receivers receive one or more locking tabs therein.

6. The bus brace apparatus of claim 4, wherein the one or more tab receivers comprise two tab receivers.

7. The bus brace apparatus of claim 6, wherein each of the two tab receivers are configured to receive a locking tab therein.

8. The bus brace apparatus of claim 4, wherein the one or more tab receivers comprise a rectangular hole.

9. The bus brace apparatus of claim 1, wherein the channel member comprises a connecting side interconnecting between the first longitudinal side and the second longitudinal side, and wherein the connecting side comprises a first tab receiver on a first end and a second tab receiver on a second end.

10. The bus brace apparatus of claim 1, wherein the channel member comprises a connecting side interconnecting between the first longitudinal side and the second longitudinal side, and wherein the connecting side comprises a first tab receiver on a first end and a second tab receiver on a second end, and wherein the first longitudinal side and the second longitudinal side are co-planar.

11. The bus brace apparatus of claim 1, comprising one or more lock brackets coupled to the bracing block and to the channel member.

12. The bus brace apparatus of claim 11, wherein the one or more lock brackets comprise a body portion having an aperture formed therein configured to receive the fastener through the aperture and the bracing block and extending tabs spaced on either side of the bracing block.

13. The bus brace apparatus of claim 11, wherein a lock bracket of the one or more lock brackets comprises a body portion having an aperture formed therein on a first end, a locking tab on a second end, and extending tabs spaced on either side of the body portion in between the first end and the second end.

14. The bus brace apparatus of claim 11, wherein at least one of the one or more lock brackets comprises a body portion, extending tabs, and a locking tab including a retaining portion, the extending tabs and the retaining portion projecting at an approximately 90 degree angle from a plane of the body portion.

15. The bus brace apparatus of claim 11, wherein the one or more lock brackets comprises two lock brackets and each of the two lock brackets comprises a body portion, extending tabs, and a locking tab including a retaining portion, wherein the retaining portion of each of the two lock brackets project towards one another.

16. The bus brace apparatus of claim 11, wherein the one or more lock brackets comprise a first lock bracket coupled to a first end of the bracing block and a second lock bracket coupled to a second end of the bracing block.

17. The bus brace apparatus of claim 11, wherein the one or more lock brackets comprise a first lock bracket coupled to a first end of the bracing block and a second lock bracket coupled to a second end of the bracing block and by the fastener securing the first lock bracket and the second lock bracket to the bracing block.

18. The bus brace apparatus of claim 1, wherein the channel member comprises a radiused corner between a connecting side and the first longitudinal side and the second longitudinal side.

19. A bus assembly, comprising:
a bus comprising a first bus bar, a second bus bar, and a third bus bar;
a first bus support configured to support each of the first, second, and third bus bars at a first end;
second bus supports configured to support each of the first, second, and third bus bars at a second end; and
a bus brace apparatus, comprising:
  a bracing block having a plurality of bus bar-receiving recesses configured to receive bus bars therein and a plurality of legs defining sides of the plurality of bus-receiving recesses, the legs including first apertures formed there through,
  an insulating positioner received in each of the plurality of bus bar-receiving recesses, each of the insulating positioners including a second aperture formed therein,
  a fastener extending through each of the first apertures and each of the second apertures and aligning each of the insulating positioners within respective ones of the plurality of bus bar-receiving recesses, and
  a channel member coupled to the bracing block and including first longitudinal side and a second longitudinal side each configured to interface with a surface of each of the insulating positioners and limit rotation of the insulating positioners about the fastener.

20. A method of bracing bus bars, comprising:
providing a first bus bar, a second bus bar, and a third bus bar;
providing a bus brace apparatus comprising a bracing block having a plurality of bus bar-receiving recesses, a plurality of legs defining sides of the plurality of bus-receiving recesses, the legs including first apertures formed there through; an insulating positioner received in each of the plurality of bus bar-receiving recesses, each of the insulating positioners including a second aperture formed therein and side surfaces; a fastener extending through each of the first apertures and each of the second apertures and aligning each of the insulating positioners within respective ones of the plurality of bus bar-receiving recesses; and a channel member coupled to the bracing block and including first longitudinal side and a second longitudinal side;
receiving the first bus bar, the second bus bar, and the third bus bar in respective ones of the plurality of bus bar-receiving recesses; and
interfacing the side surfaces of each of the insulating positioners with the first longitudinal side and the second longitudinal side of the channel member to limit rotation of the insulating positioners about the fastener.

* * * * *